United States Patent

Basham et al.

[15] 3,642,289

[45] Feb. 15, 1972

[54] FLOATING SEAL FOR FLANGED MEMBERS

[72] Inventors: Edgar W. Basham, London; John E. Knapman, Kingston-upon-Thames, both of England; Gordon D. Pollard, Houston, Tex.; John B. Anthony, London; Alan C. Munro, Turnbridge Wells Kent, both of England

[73] Assignee: Oceaneering International, Inc., Houston, Tex. by said Basham, Pollard, Anthony and Munro

[22] Filed: May 2, 1969

[21] Appl. No.: 17,356

[52] U.S. Cl. ....................................277/1, 277/30, 277/58
[51] Int. Cl. ...........................................................F16j 15/08
[58] Field of Search ................285/349, 379; 277/30, 37, 58, 277/71, 97, 98, 173, 174, 175, 100, 187, 235

[56] References Cited

UNITED STATES PATENTS 3,404,904  10/1968  Roe....................................285/349 X

Primary Examiner—Robert I. Smith
Attorney—Ned L. Conley and Murray Robinson

[57] ABSTRACT

Method and apparatus for quickly establishing a seal between two flange members, not in perfect alignment. A floating annular seal ring may be provided in a recess of one of the flange members. A resilient sealing means may be mounted in a groove on the face of the sealing ring towards the other flange member. A sliding resilient sealing means may be provided between the seal ring and the flange member in which the seal ring is mounted. The surface of the seal ring adjacent at least one of the resilient sealing means may be chamfered away from the surface of the flange member toward which it faces so that even though the flange members are not perfectly aligned the resilient sealing means may contact both flange members in sealing engagement. Means are provided for urging the seal ring toward the other flange member. Several means of coupling on flange member to the other are disclosed.

7 Claims, 8 Drawing Figures

PATENTED FEB 15 1972

Edgar W. Basham
John E. Knapman
Gordon D. Pollard
John B. Anthony
Alan C. Munro
INVENTORS

BY

Bill B Berryhill
ATTORNEY

Edgar W. Basham
John E. Knapman
Gordon D. Pollard
John B. Anthony
Alan C. Munro
INVENTORS BY
Bill B Berryhill
ATTORNEY Edgar W. Basham
John E. Knapman
Gordon D. Pollard
John B. Anthony
Alan C. Munro
INVENTORS

BY

Bill B Berryhill
ATTORNEY

FLOATING SEAL FOR FLANGED MEMBERS

BACKGROUND OF THE INVENTION

1. Field of the Invention

This invention concerns the problem of joining flanged members together in a fluidtight connection. More particularly it concerns a means of forming a fluidtight seal between two flanged vessels when it is difficult to mate the flanges so as to be perfectly flush with each other.

2. Description of the Prior Art

With the present interest in oceanography, offshore petroleum production and underwater activities in general, it is natural that a great amount of activity occurs at much greater working depths than in the past. In the past, much of the deep water work was performed by a diver with a metal helmet and diving suit to which an airhose was attached. The diver could descend rather rapidly, but coming up took a great deal of time. For example, at 200-foot depths, surfacing time might be as much as 2½ hours. To ascend quicker would cause gas bubbles in the blood and tissues to press against nerve centers causing acute pain and sometimes paralysis or even death. This great amount of time reduces the work a diver can do and increases the overall time, equipment and expense required for a particular job.

To reduce the time of descending and ascending a technique called "saturation diving" has been developed. In this technique divers are lowered to an underwater work site in an enclosed diving bell. Using aqualungs they leave the bell, which contains their air and line connections, and perform their work. When their work time is completed, they reenter the bell, seal it at working depth and are returned to the surface in the bell. The bell is attached to a pre-pressurized decompression chamber to which they transfer. Another diving team may enter the bell from the decompression chamber, or lock, and return to the ocean floor for further work. The first team may rest in the pressurized atmosphere and return to the bell again. This eliminates decompression time between dives. Furthermore, the divers may be pressurized or decompressed as they travel to and from the job site. Thus, a great deal of time and money is saved.

When connecting the diving bell and decompression chamber it is necessary to quickly establish a seal between the vessels. This may be very difficult if the connecting surfaces are not flush with one another. This problem is particularly acute since the bell and decompression chamber are heavy structures which are not easy to shift about in a completely flush relationship.

SUMMARY OF THE INVENTION

With the present invention a method and apparatus for quickly establishing a fluidtight seal between two flanged vessels is provided even though the flange members are not in perfect alignment. A floating seal with automatic compensating features is mounted in one of the flange members. When the vessels are brought together and pressure applied to one side of the floating seal, the seal is activated providing an immediate seal even though the flange members are not perfectly aligned and even though the vessels have not been rigidly locked to one another.

The diving bell and decompression lock are very heavy structures so it is important that the device and method for connecting them to each other compensate for angular misalignment of the respective flanges without having to adjust for such misalignment. The present invention provides a method and a device which is useful for making such a connection. Once the two chambers have been sealed together by use of the sealing ring, they can be held together by appropriate systems with or without hydraulic systems as will be hereinafter described. The operation of locking the vessels together may be independent of, and occurring before, the sealing operation and pressurizing of the interior.

BRIEF DESCRIPTION OF THE DRAWINGS

Other objects and advantages of the invention will become apparent from the following description when taken in conjunction with the attached drawings in which.

DESCRIPTION OF THE PREFERRED EMBODIMENTS

Figure 1:
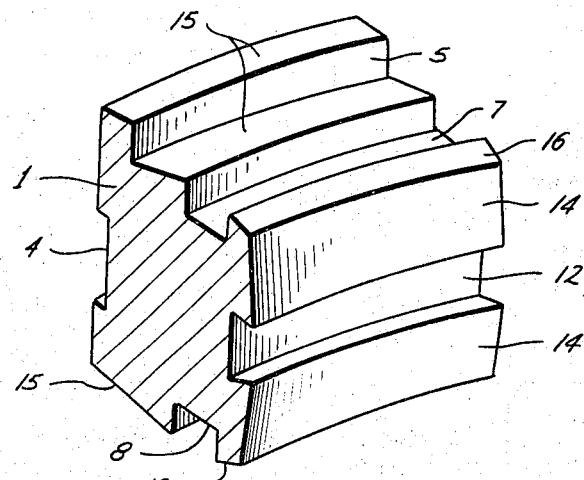
FIG. 1 is a perspective view of a portion of an annular ring used in one embodiment of the invention.

With respect to the accompanying drawings, the annular ring 1 is preferably of a material which has resistance against deformation. In a preferred embodiment this ring is made of steel. The ring is movably fitted into a cutout portion 2 of a flange 3. The rear surface of the ring is provided with an annular groove 4 and a shoulder portion 5 which restricts the forward movement of the ring by meeting a stop surface of a retaining ring 6. Opposite surfaces of the annular ring 1 are provided with grooves 7 and 8 to receive sealing means such as O-rings 9 and 10 which operate as seals against the surface of the retaining ring 6 and against the side 11 of the cutout portion of the flange, respectively. In the front face of the ring there is an annular groove 12 which receives sealing means such as an O-ring 13. The front face 14 on either side of the groove 12 is slanted backwards so that they are not in the same plane. The top surface of the ring on both sides of the groove 7 are also slanted so that they are not in the same plane, the highest point of both surfaces being that at the edges of the groove. Similarly, the surfaces on either side of the groove 8 are also slanted so that they are not in the same plane, the highest point being at the edges of the groove.

A conduit 17 is provided in the flange 3. This conduit has two openings, one 18 for the injection of a fluid which may be gaseous or liquid to be forced under pressure to the opening 19.

Figure 4:
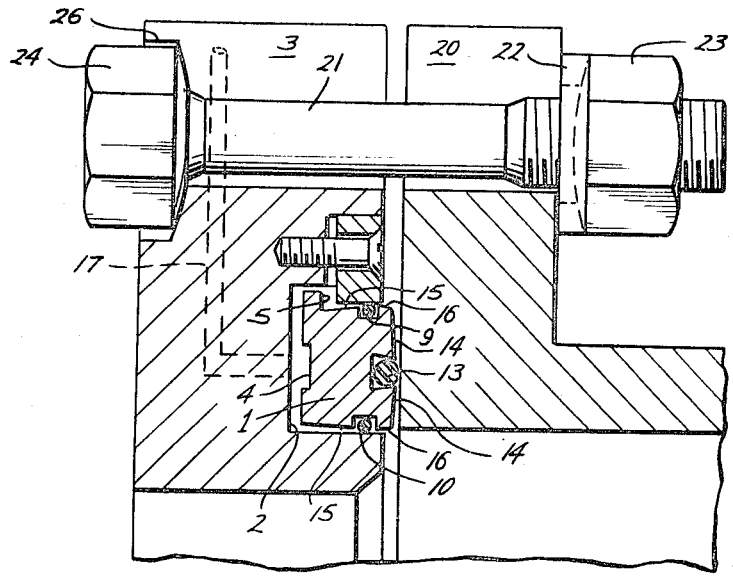
FIG. 4 is the same view as FIG. 3 but including the flanges in position to be joined and also showing a bolt and nut assembly in accordance with one embodiment of the invention.

The operation of the invention is illustrated in FIG. 4. The flanges 3 and 20 of the two structures to be connected are brought into contact with each other. At this time, the flange faces are not flush and are out of parallel with each other and the ring 1 is seated in the cutout portion 2 and there is no compression force in the conduit 17. The bolt 21 is put in position, the washer 22 is slipped over the end of the bolt and the nut 23 is turned to finger tightness. The nut and bolt can be in an assembled condition where the bolt is simply dropped into a slot. It will be understood that there can be many of these bolts around the circumference of the flanges. A gas or fluid is then injected under pressure into the conduit 17. In a particular embodiment of the invention, air was used. This fluid enters the annular groove 4 and moves the ring 1 forward until contact is made with the face of the flange 20. It is understood that the O-rings 9, 10 and 13 are made sufficiently large so that they protrude from their grooves to contact the respective opposite surfaces and form a seal. Because of the chamfering of the surfaces 15 and 16 and 14, the ring is movable so that the plane of the surface 14 on one or the other side of groove 12 approaches flush contact with the face of flange 20 and the chamfering assures that the sealing O-ring 13 will contact the opposite flange surface without the edges of the face touching the flange surface first. The compressive force applied to the ring 1 should, of course, be greater than the force within the diving bell and decompression lock so that the internal pressures will not force the ring back. It can be seen that there are effectively three surfaces which are sealed against the leakage of gas. The O-rings 9, 10 and 13 effect these seals. Thus, it is seen that while the ring 1 floats in the groove in the face of the flange, the ring is still effectively sealed in this groove and when the ring is forced outwardly into engagement with an opposing flange surface an effective seal is made quickly and easily with no more than fingertight bolts holding the two flanges together. At the same time this effective sealed connection is obtained even though the two surfaces to be joined are not flush or parallel with each other.

Figure 2:
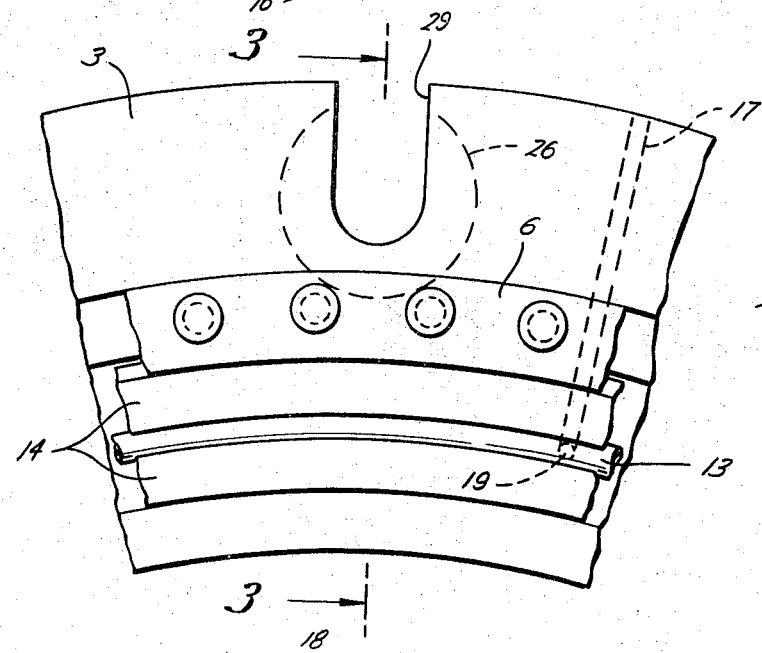
FIG. 2 is a plan view of the annular ring of FIG. 1 in place in the face of a flange.
Figure 3:
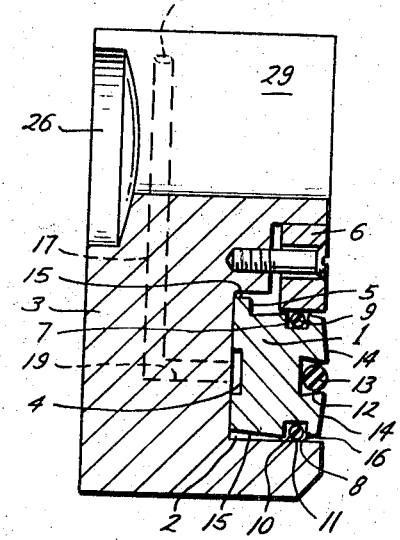
FIG. 3 is a sectional view taken on line 3—3 of FIG. 2.
Figure 5:
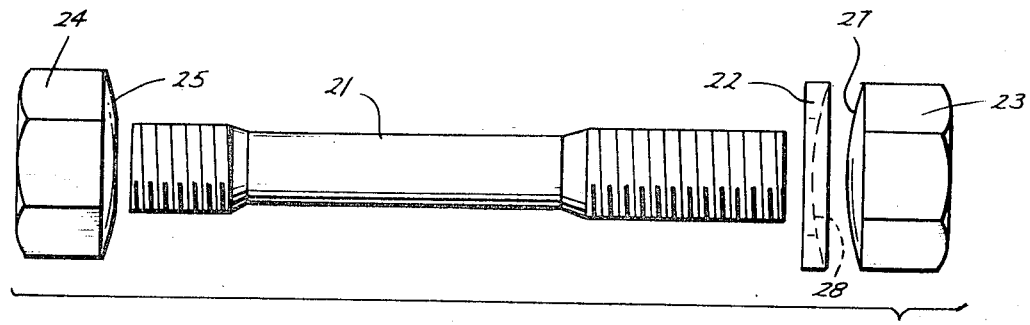
FIG. 5 is an exploded view of the bolt and nut assembly shown in FIG. 4.

Referring to FIGS. 4 and 5, the bolt is comprised of a head 24, shaft 21, a washer 22 and a nut 23. When the bolt is in place joining the two flanges 20 and 3 it is seen that because of the angle at which their faces diverge from each, stresses i.e., bending stresses, are placed on the bolt which could weaken and perhaps break the shaft. This stress is avoided by the shaping of the face 27 of the nut 23 and its action with the surface 28 of the washer 22. The surface 27 of the nut is convex and the washer 22 has a concave, in particular spherically concave side shown as 28 and this concavity is adapted to receive the convex surface 27 of the nut. The head of the bolt also has a convex surface 25 which is adapted to sit in a concave face of the cutout portion 26 in the flange 3. When the nut 27 is tightened rotational movement occurs between the mating convex and concave surfaces which allows the bolt to assume an angled position consistent with the misalignment of the connecting flanges. In the preferred embodiment of the invention, the two flange faces were held together by bolts which were dropped into matched oversized radial slots in both flanged faces. Such a slot is seen as 29 in FIG. 2. The effect of the washer with the concave surface matching the convex surface of the nut enables a significant amount of misalignment in the horizontal and vertical plane while still preserving axial forces in the bolts.

Figure 6:
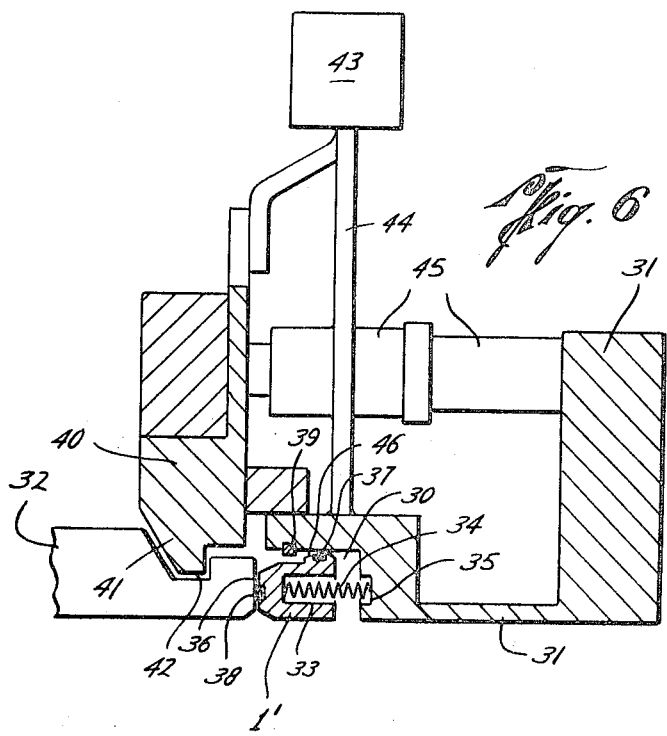
FIG. 6 is a side sectional embodiment of another embodiment of the invention showing the sealing ring and locking structure.

In FIG. 6, another preferred embodiment of the sealing ring is seen at 1'. It will be understood that this view, FIG. 6 is simply a side section and the ring 1' is actually a circular arrangement which sits in the recess formed at 30 of the connecting body 31 which is itself joined to the opening of the decompression chamber which would be at the right end of FIG. 6. The diving bell chamber door ring is seen at 32. The ring 1' has a recess 33 which receives a spring 34 which is adapted to seat at the other end in a recess 35 in the bushing of connecting body 31. The faces 36 of the sealing ring 1' are in a 180° plane so that when the decompression chamber is brought forward to be connected to the diving bell, the faces 36 will fit flush with the opposite face of the ring 32. This is different from the slanted faces 14 of the ring in FIG. 1. It often happens that the connecting body and bushing 31 joined to the decompression chamber is not in a perfectly parallel, opposite and flush relationship with the mating face of the diving bell. The sealing ring 1' is so designed that it will accommodate such a misalignment. This is accomplished by chamfered sides such as seen at 46 which permits the sealing ring to tilt in the recess 30 to accommodate the mismatch but at the same time still effect the seal. O-rings 37 and 38 in appropriate recesses of the sealing ring assist in maintaining a sealing engagement between the ring 1' and door ring 32 and a flange of bushing 31. The spring 34 functions to hold the sealing ring in engagement with the face of the diving bell ring 32. A stop 39 is positioned in a flange surface of the bushing 31 to limit travel of the sealing ring out of the recess 30. A locking ring 40 has a tooth structure 41 which is adapted to fit into a recess 42 in the door ring 32. The locking ring 40 is adapted to be turned, for example, 15°, so as to fit the flange or tooth 41 into the recess 42 thus locking the bushing 31 of the connecting body to the diving bell ring 32. This turning can be effected manually or by a hydraulic system indicated at 43 and 44 which is attached on one side to the locking ring 40 and on the other to the bushing 31. In addition, a hydraulic piston 45 is connected at one end to the locking ring 40 and at the other end to a flange of the bushing structure 31. This hydraulic piston operates to bring the bushing 31 and the locking ring 40 towards each other thus effecting a locking action of the locking ring 40 with the diving bell chamber ring 32 and the connecting bushing 31. It can be seen that although no strong pressure is brought to bear on the sealing ring 1' from this locking action, the operation of the spring 34 and the internal pressure within the decompression chamber and the diving bell chamber functions to maintain a tight seal between the two chambers.

Figure 7:
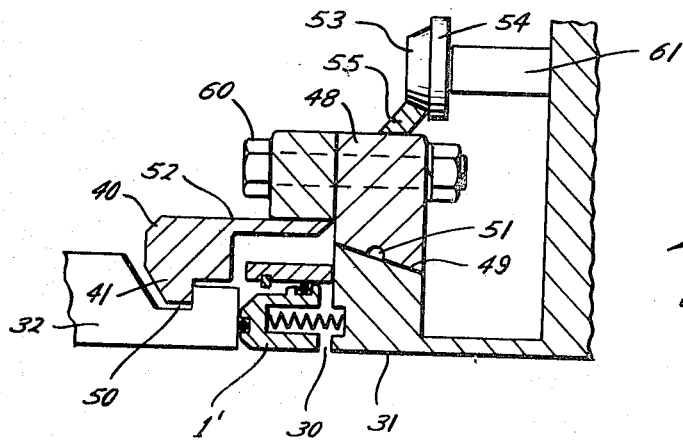
FIG. 7 is a side sectional view of another embodiment of the invention featuring a self aligning thrust ring.
Figure 8:
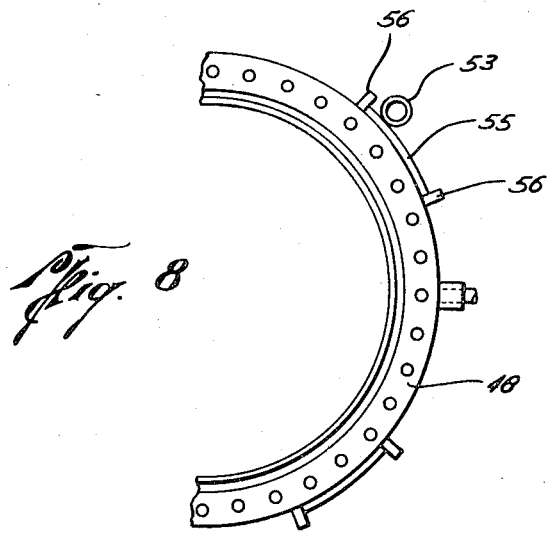
FIG. 8 is a plan view of the thrust ring of FIG. 7.

FIGS. 7 and 8 illustrate another embodiment of the invention in which the sort of sealing ring 1' as shown in FIG. 6 may be used. Structures similar to those in FIG. 1 will be given the same numerals. The sealing ring 1' is shown seated in the recess 30. The bushing or housing 31 is connected to the decompression chamber which is not seen and would be at the right-hand side of FIG. 7. A portion of the diving bell chamber is seen at 32 and the locking ring is seen at 40. In this embodiment, the principle of holding the two chambers together is different. In FIG. 6, the sealing ring 1' will effect the seal even if the two chambers are not in exact flush relationship with each other. The principle of the embodiment is to keep the chambers from separating, rather than holding them tightly to each other and allowing the floating seal to compensate for the misalignment. In the embodiment of FIGS. 7 and 8 the housing 31 has a slanted surface which mates with a slanted surface of a thrust ring 48. The mating surfaces are seen at 49. The recess 51 in the face of the thrust ring 48 facilitates lubrication of the two mating surfaces. A locking ring 52 is integral with the ring portion 40 and this locking ring is joined to the thrust ring 48 by means of a bolt 60. The thrust ring 48 with the locking ring 52 and 40 is adapted to rotate on the sloped mating surface 49 of the housing 31. The mating surfaces 49 between 31 and 48 may be spherical, with center of curvature at or close to the plane of the attachment 41 and 50. Failure to design correctly will cause large forces tending to either straighten or flex the coupling when internal pressure is applied. With this design, both angular and lateral misalignment is absorbed by rotation at 31 and 48 and sliding between 41 and 50, with no force introduced by the coupling. The chambers are joined together in the following manner. The housing 31 is brought towards the diving bell chamber ring 32 so that the sealing ring 1' is in contact with the face of the ring 32. The thrust ring 48 is brought into position over the mating surface 49 of the housing 31 with the tooth portion of the locking ring 40 engaged with the tooth recess 50 of the diving bell chamber ring 32. The thrust ring 48 and assembly locking ring 52 and 40 are rotated through about a 15° angle so as to engage the tooth 40 within the recess 50 of the ring 32. A guide wheel 53 has a flange portion 54 and this guide wheel is fastened by appropriate means 61 to the housing of the decompression chamber. It can be seen that the wheel 53 has a sloping surface to engage a raised guide member 55 which is mounted on the thrust ring 48. As seen in FIG. 8, the thrust ring has stops 56 at each end of the guide member 55. When the thrust ring 48 and locking ring assembly 40 and 52 is rotated to engage the diving bell chamber ring 32, the stops 56 limit the turning motion by engaging the wheel 53. When the chambers are joined together there is no pressure within them. After they have been joined together as just described, pressure is introduced. This internal pressure forces the seal ring into tighter engagement with the portion 32 of the diving chamber but this pressure does not escape around the sealing ring because of the nature of its construction as described above. It can be seen that this pressure acts in a direction tending to force the diving chamber and the decompression chamber apart. However, because of the slanted mating faces of the housing 31 and the thrust ring 48 and the locking action of the locking ring 40 engaging the diving bell 32, it can be seen that the chambers are prevented from being forced apart, and the spring pressure initially sealing the ring is reinforced by the pneumatic force resulting from the application of internal pressure.

We claim:

1. A floating annular sealing ring carrier for sealing between two bodies and adapted to be positioned within a recess of one of said bodies, said carrier having a chamfered side to face each body, whereby the carrier is movable angularly with respect to both of said bodies, an annular groove in each chamfered side, and a resilient sealing ring in each annular groove.

2. An annular sealing ring carrier as set forth in claim 1 wherein each chamfered side of said carrier is chamfered symmetrically on each side of said groove therein.

3. An annular sealing ring carrier as set forth in claim 1 and including stop means to limit the movement of said carrier out of said recess.

4. An annular sealing ring carrier as set forth in claim 1 characterized in that the annular grooves are positioned on the face and on the circumference of said carrier.

5. An annular sealing ring carrier as set forth in claim 4 and including means for forcing a fluid between said carrier and the wall of said recess to force the face of said carrier into sealing engagement against one of said bodies.

6. An annular sealing ring carrier as set forth in claim 4 and including means for providing combined fluid and mechanical force to bias said face of said ring into sealing engagement against one of said bodies.

7. An annular sealing ring carrier as set forth in claim 4 and including means for biasing said face of said ring into sealing engagement against one of said bodies.

* * * * *